(12) United States Patent
Madison et al.

(10) Patent No.: US 9,117,479 B1
(45) Date of Patent: Aug. 25, 2015

(54) DATA STORAGE DEVICE CALIBRATING LASER WRITE POWER FOR HEAT ASSISTED MAGNETIC RECORDING

(71) Applicant: Western Digital Technologies, Inc., Irvine, CA (US)

(72) Inventors: Michael R. Madison, Grass Valley, CA (US); Andreas Moser, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/494,710

(22) Filed: Sep. 24, 2014

(51) Int. Cl.
*G11B 5/00* (2006.01)
*G11B 11/105* (2006.01)
*G11B 5/455* (2006.01)
*G11B 7/1267* (2012.01)

(52) U.S. Cl.
CPC .......... *G11B 11/10504* (2013.01); *G11B 5/455* (2013.01); *G11B 7/1267* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |

(Continued)

OTHER PUBLICATIONS

Abhimanyu Sharma, et al., U.S. Appl. No. 13/763,972, filed Feb. 11, 2013.

*Primary Examiner* — Wayne Young
*Assistant Examiner* — Brian Butcher (57) ABSTRACT

A data storage device is disclosed comprising a head actuated over a disk, wherein the head comprises a laser configured to heat the disk during write operations. A first test pattern written at a first laser power is read to generate a first track width metric and a first peak amplitude. A second test pattern written at second laser power is read to generate a second track width metric and a second peak amplitude. The first track width metric, the first peak amplitude, the second track width metric, and the second peak amplitude are processed to estimate a coefficient C of an error function. An operating write power for the laser is calibrated based on the estimated coefficient C of the error function.

18 Claims, 5 Drawing Sheets

(56) References Cited

U.S. PATENT DOCUMENTS

| | | |
|---|---|---|
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |

(56) References Cited

U.S. PATENT DOCUMENTS

| | | |
|---|---|---|
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |

(56) References Cited

U.S. PATENT DOCUMENTS

| | | |
|---|---|---|
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,391,107 B2 | 3/2013 | Gage et al. |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 2009/0113702 A1 | 5/2009 | Hogg |
| 2010/0306551 A1 | 12/2010 | Meyer et al. |
| 2011/0205861 A1 | 8/2011 | Erden et al. |
| 2011/0226729 A1 | 9/2011 | Hogg |
| 2011/0228651 A1* | 9/2011 | Gage et al. ............ 369/13.24 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0077453 A1 | 3/2013 | Alex |
| 2013/0135975 A1 | 5/2013 | Gage et al. |
| 2014/0119164 A1 | 5/2014 | Wilson et al. |

* cited by examiner

DATA STORAGE DEVICE CALIBRATING LASER WRITE POWER FOR HEAT ASSISTED MAGNETIC RECORDING

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

Figure 1:
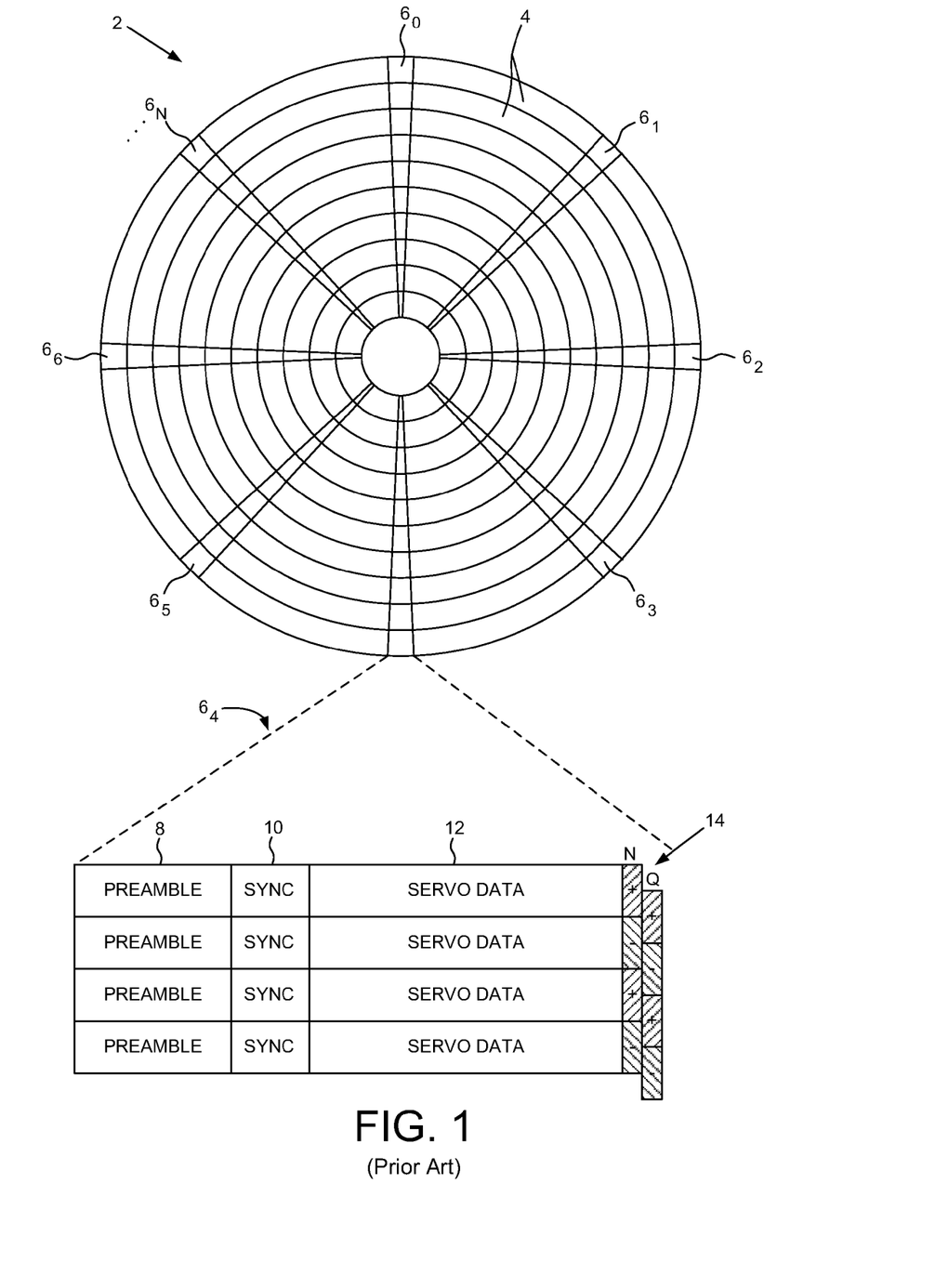
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figures 2A, 2B, 2C:
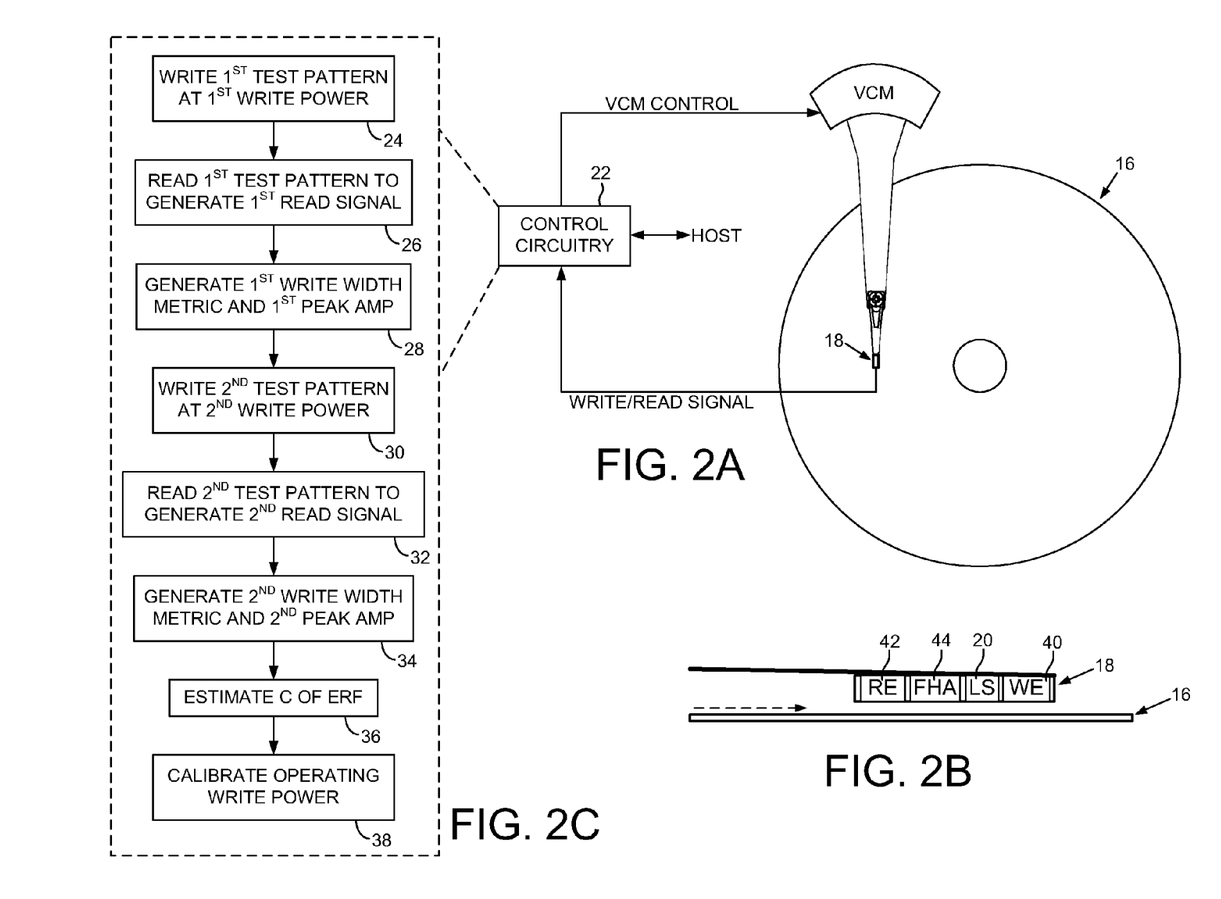
FIG. 2A shows a data storage device in the form of a disk drive comprising a head actuated over a disk according to an embodiment.
FIG. 2B shows a head according to an embodiment comprising a laser configured to heat the disk during write operations.
FIG. 2C is a flow diagram according to an embodiment wherein an operating write power applied to the laser is calibrated based on an estimated coefficient C of an error function.

FIG. 2A shows a data storage device in the form of a disk drive according to an embodiment comprising a disk 16, and a head 18 actuated over the disk 16, wherein the head 18 (FIG. 2B) comprises a laser 20 configured to heat the disk 16 while writing data to the disk 16. The disk drive further comprises control circuitry 22 configured to execute the flow diagram of FIG. 2C, wherein a first write power is applied to the laser and a first test pattern is written to the disk (block 24). The first test pattern is read while the head crosses over a width of the first test pattern to generate a first read signal (block 26), and a first track width metric and a first peak amplitude are generated based on the first read signal (block 28). A second write power is applied to the laser and a second test pattern is written to the disk (block 30). The second test pattern is read while the head crosses over a width of the second test pattern to generate a second read signal (block 32), and a second track width metric and a second peak amplitude are generated based on the second read signal (block 34). The first track width metric, the first peak amplitude, the second track width metric, and the second peak amplitude are processed to estimate a coefficient C of an error function:

$$\text{PeakAmplitude} = A\max * \text{erf}(\text{TrackWidthMetric}/C).$$

An operating write power for the laser is calibrated based on the estimated coefficient C of the error function.

In the embodiment of FIG. 2B, the head 18 comprises a suitable write element 40 (e.g., an inductive write coil), a suitable read element 42 (e.g., a magnetoresistive element), and a suitable fly height actuator (FHA) 44 (e.g., a thermal element). Any suitable laser 20 may also be employed in the head 18, such as a suitable laser diode, together with any other suitable optical components for implementing HAMR, such as a suitable waveguide and a suitable near field transducer for focusing the laser beam onto the surface of the disk 16. In one embodiment, an operating write power applied to the laser 20 during write operations is calibrated in order to achieve sufficient reliability of the recorded data. Applying too low an operating write power may undersaturate the media, whereas too high an operating write power may cause inter-track interference (ITI) due to an excessive track width.

Figure 4A:
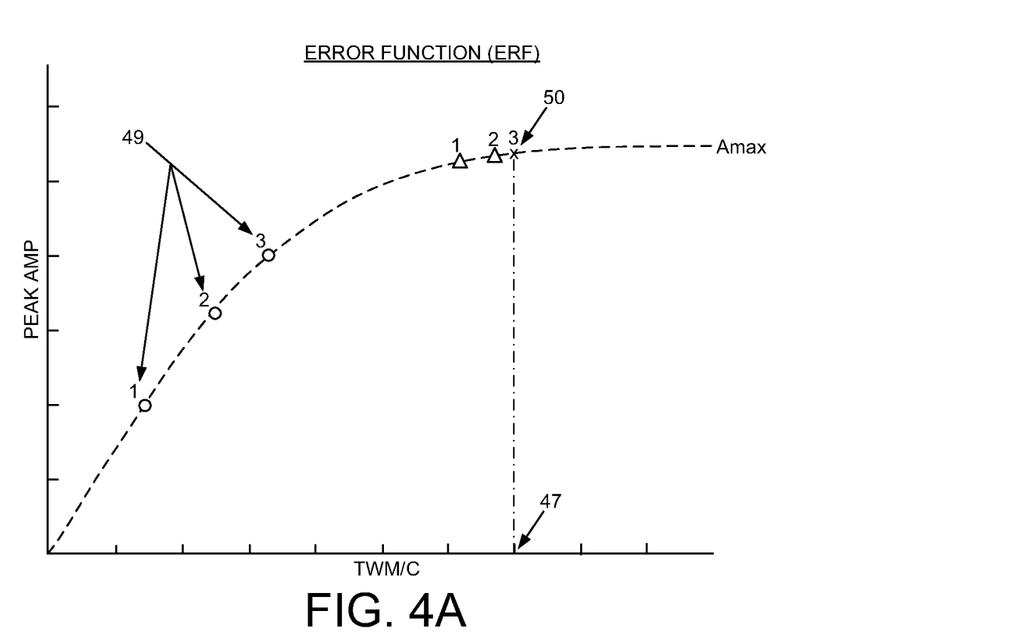
FIG. 4A illustrates the peak amplitude of the read signal versus a ratio of a track width metric (TWM) to the coefficient C of an error function according to an embodiment.

In one embodiment, the write power applied to the laser and the resulting track width written on the disk may be represented by the above error function an example of which is illustrated in FIG. 4A. The error function correlates a track width metric with a peak amplitude of the read signal while reading a test pattern on the disk as the head moves across a width of the test pattern. Both the peak amplitude and track width metric are dependent on the amount of write power applied to the laser. In one embodiment, the above error function may be represented as a Gauss error function:

$$\mathrm{erf}(x) = \frac{2}{\sqrt{\pi}} \int_0^x e^{-t^2} dt$$

In one embodiment, the operating write power for the laser may be selected based on a target peak amplitude as defined by the error function. For example, in one embodiment the error function such as shown in FIG. 4A may be estimated, and a write power for the laser that corresponds to a target point in the error function may be selected as the operating write power for the laser.

Figure 3A:
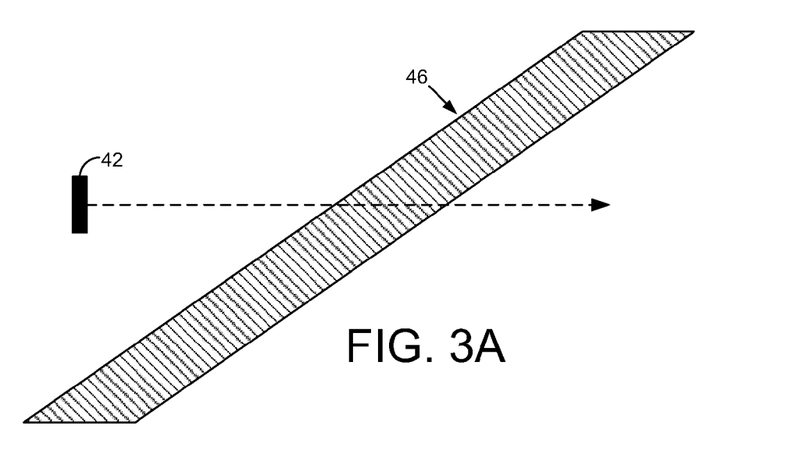
FIG. 3A shows an embodiment wherein a track width metric is generated by maintaining the head at a substantially constant radial location while reading a slanted test pattern according to an embodiment.
Figure 3B:
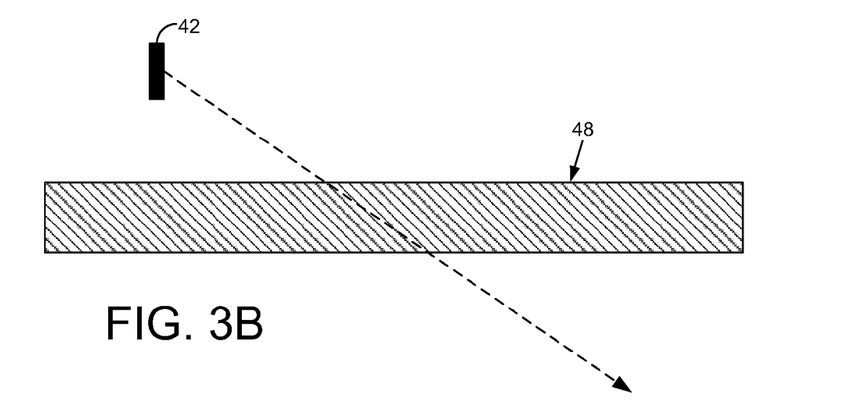
FIG. 3B shows an embodiment wherein a track width metric is generated by moving the head at a substantially constant velocity radially over the disk while reading a concentric test pattern according to an embodiment.
Figure 3C:
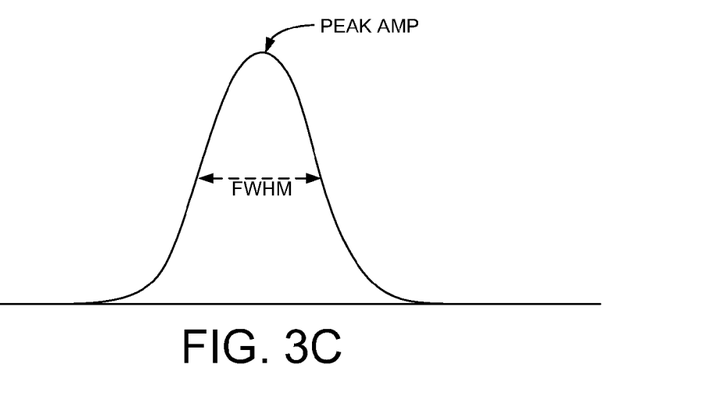
FIG. 3C shows an embodiment wherein a read signal generated by reading the test pattern comprises a pulse having a peak amplitude and a full width half maximum (FWHM).

FIG. 3A shows an embodiment wherein a test pattern 46 may be written to the disk 16 while moving the head 18 at a substantially constant velocity radially over the disk 16 resulting in a slanted test pattern. After writing the test pattern 46, the control circuitry 22 may maintain the head 18 at a substantially constant radial location while using the read element 42 to read the test pattern 46. FIG. 3C shows an example pulse that is generated as the read element 42 passes over the test pattern 46, wherein the pulse comprises a peak amplitude and a full width half maximum (FWHM) both of which depend on the physical width of the test pattern 46 as well as the physical width of the read element 42. As the physical width of the test pattern increases (by increasing the write power applied to the laser 20), the peak amplitude of the resulting read signal pulse will eventually saturate as illustrated in FIG. 4A. In one embodiment, the operating write power for the laser may be selected relative to the point in FIG. 4A where the peak amplitude begins to saturate. FIG. 3B illustrates an alternative embodiment for generating the read signal pulse shown in FIG. 3C by moving the read element 42 at a substantially constant velocity across the width of a concentric test pattern 48 (e.g., a test pattern 48 written while maintaining the head 18 at a substantially constant radial location).

In one embodiment, the error function such as shown in FIG. 4A including the coefficient C may be estimated by writing the test pattern to the disk using at least two different write powers applied to the laser, and by generating a corresponding peak amplitude and track width metric of the pulse generated by reading the test pattern. Any suitable track width metric may be generated, wherein in one embodiment the track width metric may be generated by integrating the read signal representing the pulse such as shown in FIG. 3C, and in another embodiment the track width metric may be generated based on a product of the peak amplitude and the FWHM of the pulse. In the example embodiment shown in FIG. 4A, the peak amplitude and track width metric are generated for a test pattern written at three different laser powers. The three initial data points 49 are then used to estimate the above described error function including the coefficient C, for example, using a suitable curve fitting technique.

Once the error function has been estimated, a target peak amplitude may be selected based on the error function, such as the peak amplitude 50 shown in the example of FIG. 4A. From the target peak amplitude there is a corresponding target value 47 in FIG. 4A for the ratio:

TrackWidthMetric/$C$ and from the estimated coefficient C there is a corresponding target track width metric:

TargetTrackWidthMetric=TargetRatio·$C$

Figure 4B:
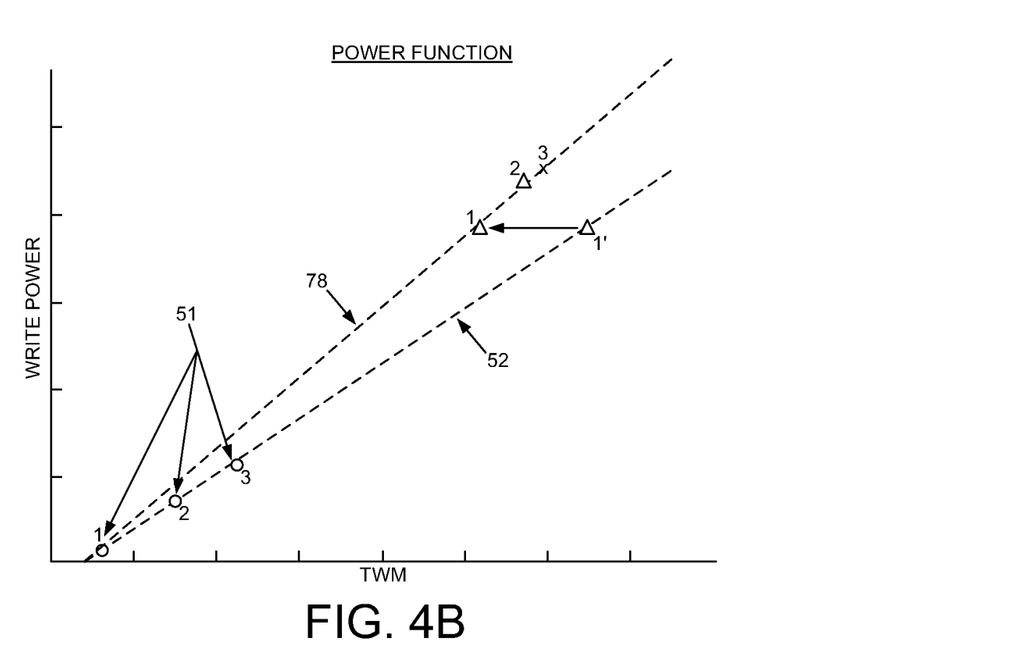
FIG. 4B illustrates the laser power versus the track width metric according to an embodiment.

In one embodiment, the track width metrics generated by writing the test pattern at the different laser write powers are processed to generate a power function representing a relationship between the laser power to the track width metric, an example of which is shown in FIG. 4B. That is, the initial three data points 49 used to estimate the error function shown in FIG. 4A may correspond to three data points 51 in FIG. 4B used to estimate the power function 52 (e.g., based on a liner curve fit). Based on the above target track width metric a corresponding write power Δ1' for the laser is generated based on the estimated power function 52.

In one embodiment, the initial write power selected for the laser based on the initial estimate of the error function and the power function (FIGS. 4A and 4B) may be used as the operating write power for the laser. In another embodiment, the initial estimate of the error function shown in FIG. 4A and/or the initial estimate of the power function 52 shown in FIG. 4B may not be sufficiently accurate. Accordingly in one embodiment the process of estimating the error function and the power function is iterated until both functions converge to a congruent result.

Figure 5:
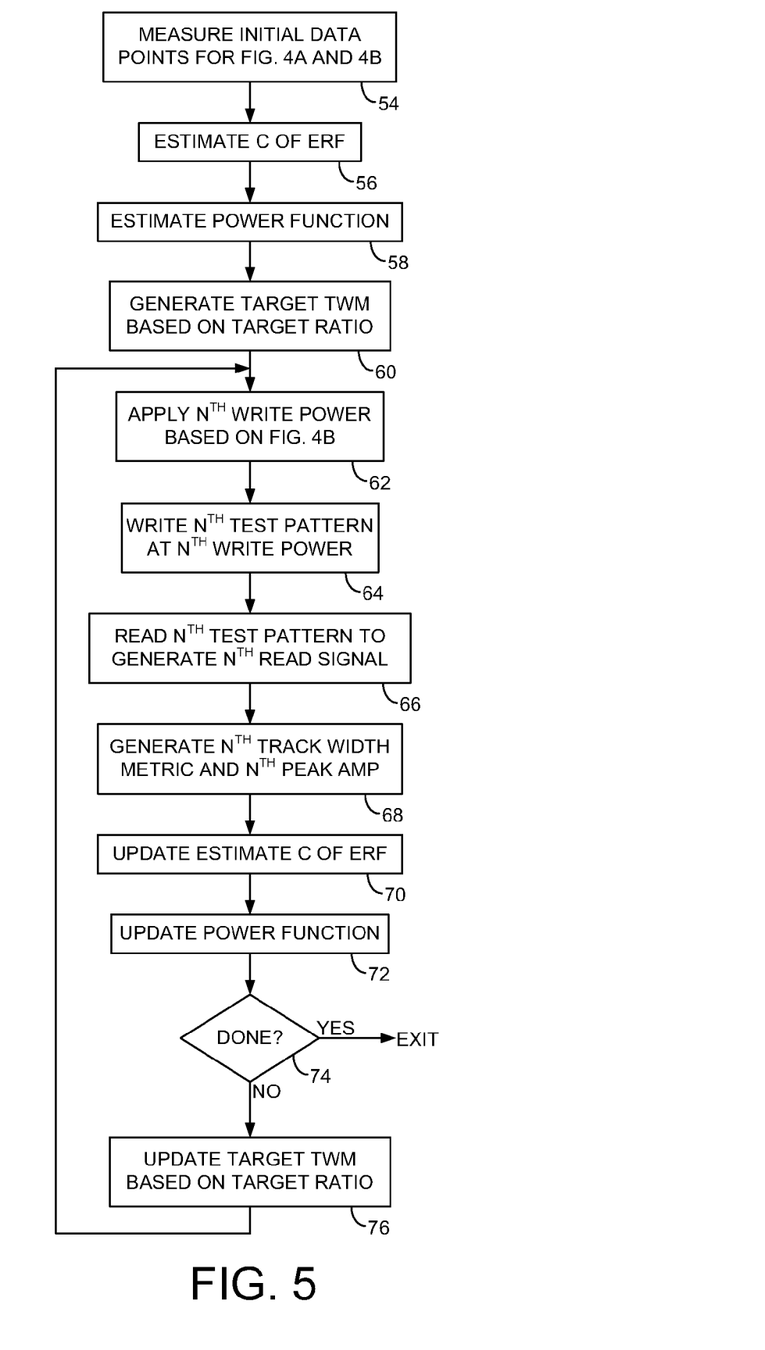
FIG. 5 is a flow diagram for calibrating the operating write power for the laser by iteratively updating the coefficient C of the error function.

The flow diagram of FIG. 5 illustrates an example of this embodiment wherein the initial data points for the peak amplitude and track width metric are generated (block 54) for a number of different write powers applied to the laser. An initial estimate of the error function shown in FIG. 4A is generated, including an initial estimate of the coefficient C (block 56), and an initial estimate of the power function shown in FIG. 4B is generated (block 58). A target track width metric is generated based on a target ratio (TWM/C) that corresponds to a target point in the error function shown in FIG. 4A (block 60). A Nth write power corresponding to the target track width metric as determined using the power function of FIG. 4B is applied to the laser (block 62) and an Nth test pattern is written to the disk at the Nth write power (block 64). The Nth test pattern is read to generate an Nth read signal (block 66), and an Nth track width metric and an Nth peak amplitude for the resulting read signal pulse is generated (block 68). The error function shown in FIG. 4A is updated including updating the estimate of the coefficient C (block 70) and the power function shown in FIG. 4B is updated (block 72) by curve fitting all of the data points including the new data point (Nth track width metric and Nth peak amplitude). For example, the estimated power function shown in FIG. 4B may be updated from the initial linear function 52 to an updated linear function 78 based on the initial data points 51 and the new data point Δ1. If the delta update to the error function and/or the power function is less than a threshold, the write power in FIG. 4B that corresponds to the final target track width metric is selected as the operating write power for the laser (block 74). Otherwise the target point in the updated error function of FIG. 4A may be determined, which may correspond to an updated target ratio (TWM/C), and an updated target track width metric (block 76) based on the updated coefficient C:

TargetTrackWidthMetric=TargetRatio·$C$

The flow diagram of FIG. 5 may then be repeated from block 62 until the error function and the power function converge to a congruent result. In the example shown in FIGS. 4A and 4B, the error function and power function may converge to a congruent result after executing three iterations of the flow diagram of FIG. 5.

In one embodiment, when initially estimating the error function such as shown in FIG. 4A the initial write power levels applied to the laser may be selected to ensure the laser 20 is not damaged as well as ensure the initial data points (e.g., the initial three data points 49) fall on the non-linear segment (the curve) of the error function. This embodiment may help ensure the initial data points provide a sufficiently accurate initial estimate of the error function.

In the embodiment of FIG. 4B, the data points may be curve fitted based on a linear function when estimating the power function, as well as to updated the power function at block 72 in the flow diagram of FIG. 5. However, in other embodiments the data points may be curve fitted based on a suitable non-linear function, such as a suitable polynomial function. In one embodiment, employing a linear function to estimate the power function in FIG. 4B may help ensure the laser 20 is not damaged due to an excessive write power, whereas employing a more sophisticated non-linear function may decrease the convergence time by reducing the number of iterations in FIG. 5.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
    a disk;
    a head actuated over the disk, wherein the head comprises a laser configured to heat the disk while writing data to the disk; and
    control circuitry configured to:
    apply a first write power to the laser and write a first test pattern to the disk;
    read the first test pattern while the head crosses over a width of the first test pattern to generate a first read signal;
    generate a first track width metric based on the first read signal;
    generate a first peak amplitude based on the first read signal;
    apply a second write power to the laser and write a second test pattern to the disk;
    read the second test pattern while the head crosses over a width of the second test pattern to generate a second read signal;
    generate a second track width metric based on the second read signal;
    generate a second peak amplitude based on the second read signal;
    process the first track width metric, the first peak amplitude, the second track width metric, and the second peak amplitude to estimate a coefficient C of an error function (erf):

$$\text{PeakAmplitude} = A\max * \text{erf}(\text{TrackWidthMetric}/C)$$

where A max represents a maximum peak amplitude; and
    calibrate an operating write power for the laser based on the estimated coefficient C of the error function.

2. The data storage device as recited in claim 1, wherein the control circuitry is further configured to:
    move the head at a substantially constant velocity radially over the disk while writing the first test pattern; and
    maintain the head at a substantially constant radial location while reading the first test pattern to generate the first read signal.

3. The data storage device as recited in claim 1, wherein the control circuitry is further configured to:
    maintain the head at a substantially constant radial location while writing the first test pattern; and move the head at a substantially constant velocity radially over the disk while reading the first test pattern to generate the first read signal.

4. The data storage device as recited in claim 1, wherein the control circuitry is further configured to generate the first track width metric based on a product of the first peak amplitude and a full width at half maximum (FWHM) of a pulse represented by the first read signal.

5. The data storage device as recited in claim 1, wherein the control circuitry is further configured to generate the first track width metric by integrating the first read signal.

6. The data storage device as recited in claim 1, wherein the control circuitry is further configured to calibrate the operating write power by processing the first write power, the first track width metric, the second write power, and the second track width metric to generate a power function representing a relationship between the laser power to the track width metric.

7. The data storage device as recited in claim 6, wherein the control circuitry is further configured to calibrate the operating write power by:
generating a first target track width metric based on a target value for the ratio:

TrackWidthMetric/$C$; and generating a third write power for the laser based on the power function and the first target track width metric.

8. The data storage device as recited in claim 7, wherein the control circuitry is further configured to:
apply the third write power to the laser and write a third test pattern to the disk;
read the third test pattern while the head crosses over a width of the third test pattern to generate a third read signal;
generate a third track width metric based on the third read signal; and
update the coefficient $C$ of the error function based on the third track width metric.

9. The data storage device as recited in claim 8, wherein the control circuitry is further configured to calibrate the operating write power by:
using the updated coefficient $C$ to generate a second target track width metric based on the target value for the ratio:

TrackWidthMetric/$C$; and generating a fourth write power for the laser based on the power function and the second target track width metric.

10. A method of operating a data storage device, the method comprising:
applying a first write power to a laser of a head and writing a first test pattern to a disk;
reading the first test pattern while the head crosses over a width of the first test pattern to generate a first read signal;
generating a first track width metric based on the first read signal;
generating a first peak amplitude based on the first read signal;
applying a second write power to the laser and writing a second test pattern to the disk;
reading the second test pattern while the head crosses over a width of the second test pattern to generate a second read signal;
generating a second track width metric based on the second read signal;
generating a second peak amplitude based on the second read signal;
processing the first track width metric, the first peak amplitude, the second track width metric, and the second peak amplitude to estimate a coefficient $C$ of an error function (erf):

PeakAmplitude=$A$max*erf(TrackWidthMetric/$C$)

where A max represents a maximum peak amplitude; and
calibrating an operating write power for the laser based on the estimated coefficient $C$ of the error function.

11. The method as recited in claim 10, further comprising:
moving the head at a substantially constant velocity radially over the disk while writing the first test pattern; and
maintaining the head at a substantially constant radial location while reading the first test pattern to generate the first read signal.

12. The method as recited in claim 10, further comprising:
maintaining the head at a substantially constant radial location while writing the first test pattern; and
moving the head at a substantially constant velocity radially over the disk while reading the first test pattern to generate the first read signal.

13. The method as recited in claim 10, further comprising generating the first track width metric based on a product of the first peak amplitude and a full width at half maximum (FWHM) of a pulse represented by the first read signal.

14. The method as recited in claim 10, further comprising generating the first track width metric by integrating the first read signal.

15. The method as recited in claim 10, further comprising calibrating the operating write power by processing the first write power, the first track width metric, the second write power, and the second track width metric to generate a power function representing a relationship between the laser power to the track width metric.

16. The method as recited in claim 15, further comprising calibrating the operating write power by:
generating a first target track width metric based on a target value for the ratio:

TrackWidthMetric/$C$; and generating a third write power for the laser based on the power function and the first target track width metric.

17. The method as recited in claim 16, further comprising:
applying the third write power to the laser and write a third test pattern to the disk;
reading the third test pattern while the head crosses over a width of the third test pattern to generate a third read signal;
generating a third track width metric based on the third read signal; and
updating the coefficient $C$ of the error function based on the third track width metric.

18. The method as recited in claim 17, further comprising calibrating the operating write power by:
using the updated coefficient $C$ to generate a second target track width metric based on the target value for the ratio:

TrackWidthMetric/$C$; and generating a fourth write power for the laser based on the power function and the second target track width metric.

* * * * *